(12) United States Patent
Winton et al.

(10) Patent No.: US 11,627,394 B2
(45) Date of Patent: Apr. 11, 2023

(54) LOUDSPEAKER ASSEMBLY FOR PROVIDING AUDIO EXTERNAL TO A VEHICLE

(71) Applicant: Harman International Industries, Incorporated, Stamford, CT (US)

(72) Inventors: Riley Winton, Opelika, AL (US); Chris Ludwig, Bloomfield Hills, MI (US); Christopher Michael Trestain, Livonia, MI (US); Maxwell B. Willis, Royal Oak, MI (US)

(73) Assignee: Harman International Industries, Incorporated, Stamford, CT (US)

( * ) Notice: Subject to any disclaimer, the term of this patent is extended or adjusted under 35 U.S.C. 154(b) by 198 days.

(21) Appl. No.: 17/135,115

(22) Filed: Dec. 28, 2020

(65) Prior Publication Data

US 2021/0204046 A1    Jul. 1, 2021

Related U.S. Application Data

(60) Provisional application No. 62/955,658, filed on Dec. 31, 2019.

(51) Int. Cl.
*B60R 11/02* (2006.01)
*H04R 1/02* (2006.01)
(Continued)

(52) U.S. Cl.
CPC .......... *H04R 1/023* (2013.01); *B60R 11/0217* (2013.01); *B60R 13/04* (2013.01);
(Continued)

(58) Field of Classification Search
CPC ........ B60R 2011/0021; B60R 11/0223; H04R 2499/13
See application file for complete search history.

(56) References Cited

U.S. PATENT DOCUMENTS

| | | |
|---|---|---|
| 9,549,243 B2 * | 1/2017 | Stys .......................... H04R 1/02 |
| 10,235,985 B2 | 3/2019 | Christoph et al. |

(Continued)

FOREIGN PATENT DOCUMENTS

| | | |
|---|---|---|
| EP | 2603017 B1 | 7/2016 |
| EP | 3515090 A1 | 7/2019 |

OTHER PUBLICATIONS

European Partial Search Report for Application No. 20217791.1, dated Apr. 30, 2021, 15 pages.

(Continued)

*Primary Examiner* — Kile O Blair
(74) *Attorney, Agent, or Firm* — Brooks Kushman P.C.

(57) ABSTRACT

A loudspeaker assembly for a vehicle includes a loudspeaker mounted in the vehicle, the loudspeaker having a first side facing an interior of the vehicle and an opposed second side. The loudspeaker is configured to generate an acoustical signal having a front wave directed into the interior of the vehicle and a rear wave directed away from the interior of the vehicle. An acoustic coupler is disposed on the second side of the loudspeaker and extending toward an exterior of the vehicle, the acoustic coupler arranged to transmit the rear wave to the exterior of the vehicle such that the acoustical signal is audible in the interior of the vehicle and at the exterior of the vehicle.

17 Claims, 4 Drawing Sheets

(51) Int. Cl.
  *B60R 13/04*   (2006.01)
  *B60R 13/08*   (2006.01)
  *B60R 11/00*   (2006.01)

(52) U.S. Cl.
  CPC ... *B60R 13/0892* (2013.01); *B60R 2011/0003* (2013.01); *B60R 2011/0043* (2013.01); *H04R 2499/13* (2013.01)

(56) References Cited

U.S. PATENT DOCUMENTS

| | | |
|---|---|---|
| 10,631,081 B2 | 4/2020 | Wheeler et al. |
| 2015/0098586 A1* | 4/2015 | Tanabe ............... H04R 1/2849 381/86 |
| 2016/0052449 A1* | 2/2016 | Okuyama ............ G10K 11/22 381/86 |
| 2019/0232883 A1* | 8/2019 | Servadio ............ B60R 11/0217 |

OTHER PUBLICATIONS

European Examination Report for Application No. 20 217 731.1, dated Jun. 27, 2022, 7 pages.
European Search Report for Application No. 20217791.1, dated Dec. 17, 2021, 15 pages.

* cited by examiner

LOUDSPEAKER ASSEMBLY FOR PROVIDING AUDIO EXTERNAL TO A VEHICLE

CROSS-REFERENCE TO RELATED APPLICATIONS

This application claims the benefit of U.S. provisional application Ser. No. 62/955,658 filed Dec. 31, 2019, the disclosure of which is hereby incorporated in its entirety by reference herein.

TECHNICAL FIELD

Embodiments relate to a loudspeaker assembly for providing audio external to a vehicle.

BACKGROUND

Automotive audio systems typically include several loudspeakers positioned in various locations within the interior of a vehicle, such as the passenger compartment or the trunk. Typical loudspeaker positions may include door panels or interior trim panels. Low-frequency loudspeakers, also known as woofers or subwoofers, are often located in the trunk, the rear panel shelf, under the rear seats, the chassis or in other frame elements of a vehicle. In an externally coupled subwoofer (ECS), the loudspeaker housing may be omitted because the front and the back side of the loudspeaker are isolated from each other by a vehicle panel or frame element. This approach provides a very compact and weight efficient arrangement for audio inside the passenger compartment without sacrificing acoustical performance.

However, providing audio external to the vehicle typically requires extra hardware, speakers, wiring, and greater complexity. The greatest consideration is attributed to low frequency output, which requires the largest, heaviest components to meet output requirements.

SUMMARY

In one or more embodiments, a loudspeaker assembly for a vehicle includes a loudspeaker mounted in the vehicle, the loudspeaker having a first side facing an interior of the vehicle and an opposed second side. The loudspeaker is configured to generate an acoustical signal having a front wave directed into the interior of the vehicle and a rear wave directed away from the interior of the vehicle. An acoustic coupler is disposed on the second side of the loudspeaker and extending toward an exterior of the vehicle, the acoustic coupler arranged to transmit the rear wave to the exterior of the vehicle such that the acoustical signal is audible in the interior of the vehicle and at the exterior of the vehicle.

In one or more embodiments, an externally coupled loudspeaker assembly for a vehicle includes a subwoofer mounted in the vehicle, the subwoofer having a first side facing an interior of the vehicle and an opposed second side. The subwoofer is configured to generate an acoustical signal having a front wave directed into the interior of the vehicle and a rear wave directed away from the interior of the vehicle. An acoustic coupler is provided having an inlet portion disposed on the second side of the subwoofer, an outlet portion in fluid communication with an exterior of the vehicle, and a conduit extending between the inlet portion and the outlet portion, where the acoustic coupler is arranged to transmit the rear wave to the exterior of the vehicle such that the acoustical signal is audible in the interior of the vehicle and at the exterior of the vehicle.

In one or more embodiments, an audio system for a vehicle includes at least one loudspeaker assembly including a loudspeaker mounted in the vehicle, the loudspeaker having a first side facing an interior of the vehicle and an opposed second side. The loudspeaker is configured to generate an acoustical signal having a front wave directed into the interior of the vehicle and a rear wave directed away from the interior of the vehicle. An acoustic coupler is disposed on the second side of the loudspeaker and extending toward an exterior of the vehicle, the acoustic coupler arranged to transmit the rear wave to the exterior of the vehicle such that the acoustical signal is audible in the interior of the vehicle and at the exterior of the vehicle. The audio system further comprises a control unit in electrical communication with the at least one loudspeaker assembly for controlling parameters of the loudspeaker and the generated acoustical signal.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
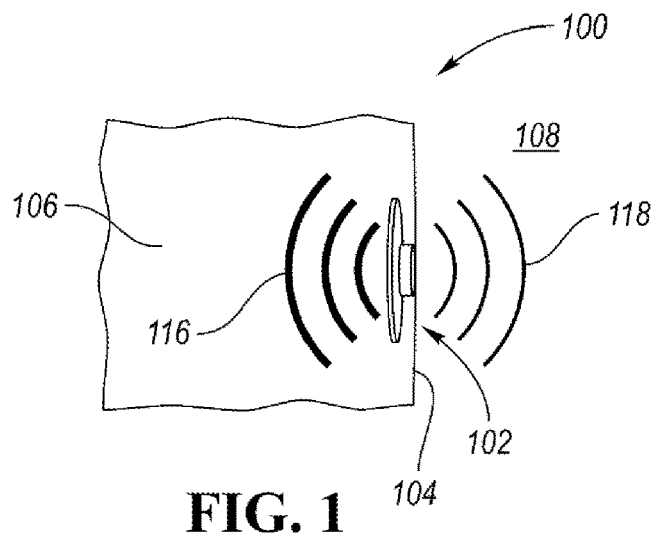
FIG. 1 is a schematic illustration of an externally coupled loudspeaker mounted in a baffle to generate a front sound wave into the interior of a vehicle and a rear sound wave to the exterior of the vehicle.

In acoustical terms, an ECS configuration is referred to as an "infinite baffle", allowing optimized low frequency extension and maximized bandwidth, while simultaneously eliminating the requirement for a large sealed or vented-box subwoofer enclosure. By definition, a loudspeaker in an infinite baffle configuration disperses the same amount of acoustical energy outside the vehicle as it does inside the vehicle, such as illustrated in FIG. 1. In the past, this exterior energy has typically been viewed as an annoyance to be minimized. However, with the advent of external audio entertainment systems in some vehicles, this external acoustical energy can actually serve a valuable purpose without adding any additional hardware.

Accordingly, embodiments disclosed herein include a loudspeaker assembly for providing audio entertainment capability external to a vehicle, wherein the loudspeaker assembly may include an externally coupled loudspeaker. Referring first to FIG. 1, a schematic illustration of a vehicle 100 with a loudspeaker 102 mounted therein is shown. In this illustration, the loudspeaker 102 is arranged in a baffle 104, such as a vehicle body panel, which forms a barrier between the interior 106 and the exterior 108 of the vehicle 100. The baffle 104 may include an opening or cavity in which the loudspeaker 102 is arranged. In one or more embodiments, the loudspeaker 102 may be a subwoofer and may be part of an automotive audio system. It is understood that an automotive audio system may comprise several loudspeakers, although only one loudspeaker 102 is exemplarily illustrated herein.

Loudspeakers, such as subwoofers, that provide low-frequency sound require a large enclosure volume. In general, subwoofers generally emit sound between 20 Hz and 200 Hz, while traditional woofers generally emit sound between 40 Hz and 400 Hz. If the loudspeaker 102 is positioned in the frame or chassis of the vehicle 100 between the interior 106 and the exterior 108 of the vehicle 100, an otherwise necessary loudspeaker housing may be omitted. In one non-limiting example, the loudspeaker 102 may be disposed within the trunk of the vehicle 100 adjacent a rear quarter panel. Alternatively, the loudspeaker 102 could be installed within the passenger compartment of the vehicle 100 or another suitable interior location.

Figure 2:
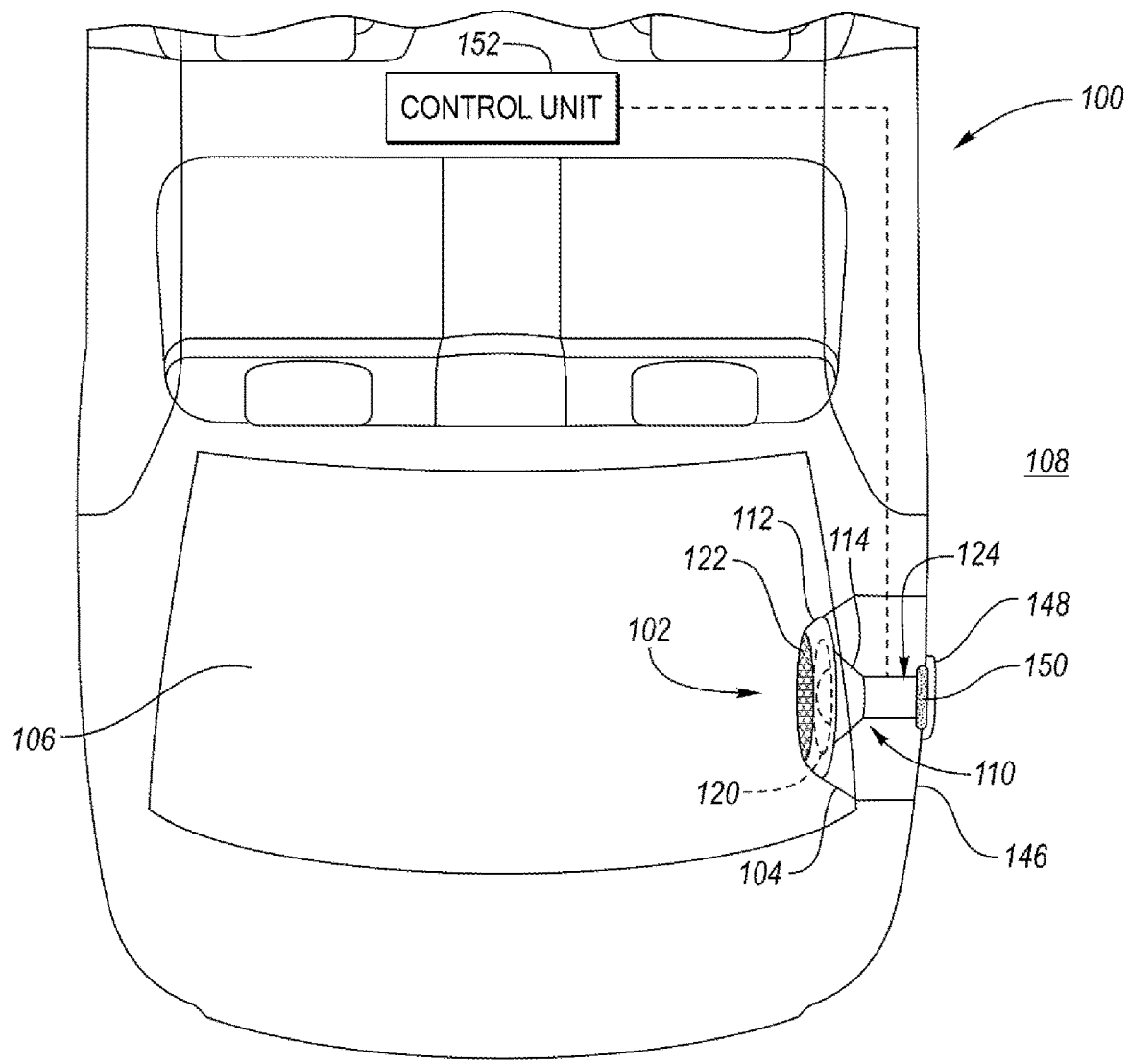
FIG. 2 is a schematic illustration of a vehicle showing a loudspeaker assembly according to one or more embodiments including an acoustic coupler connecting a second side of the loudspeaker to the exterior of the vehicle.

Accordingly, with reference next to FIG. 2, a loudspeaker assembly 110 for a vehicle 100 is shown and described herein which includes a loudspeaker 102 mounted in the vehicle 100, the loudspeaker 102 having a first side 112 facing the vehicle interior 106 and an opposed second side 114. The loudspeaker 102 is configured to generate an acoustical signal having a front wave 116 (FIG. 1) directed into the interior 106 of the vehicle 100 and a rear wave 118 (FIG. 1) directed away from the interior 106 of the vehicle 100 and toward the exterior 108 of the vehicle 100. The loudspeaker 102 includes a diaphragm or cone 120 for generating the front wave 116 and rear wave 118, wherein the cone 120 which may be formed of paper, paper composites/laminates, plastic such as polypropylene or mineral/fiber-filled polypropylene, or other suitable materials. An interior speaker grill 122 may cover the cone 120 at the first side 112 of the loudspeaker 102 and may be visible within the vehicle interior 106. The loudspeaker 102 may be mounted in a baffle 104, such as within an opening in an interior body panel.

In order to optimize the sound transmission from the second side 114 of the loudspeaker 102 to the exterior 108 of the vehicle 100, the loudspeaker assembly 110 further includes an acoustic coupler 124 disposed on the second side 114 of the loudspeaker 102 and extending toward the vehicle exterior 108. The acoustic coupler 124 is arranged to transmit the rear wave 118 to the exterior 108 of the vehicle 100 such that the acoustical signal is audible both in the interior 106 and at the exterior 108 of the vehicle 100. In the embodiments disclosed herein, the acoustic coupler 124 may act as a baffle to form a barrier between the interior 106 and the exterior 108 of the vehicle 100. This configuration allows full performance of the loudspeaker 102 in the traditional forward direction into the vehicle interior 106, but also enables sound to be generated on the exterior 108 of the vehicle 100 for external audio entertainment.

Figure 3:
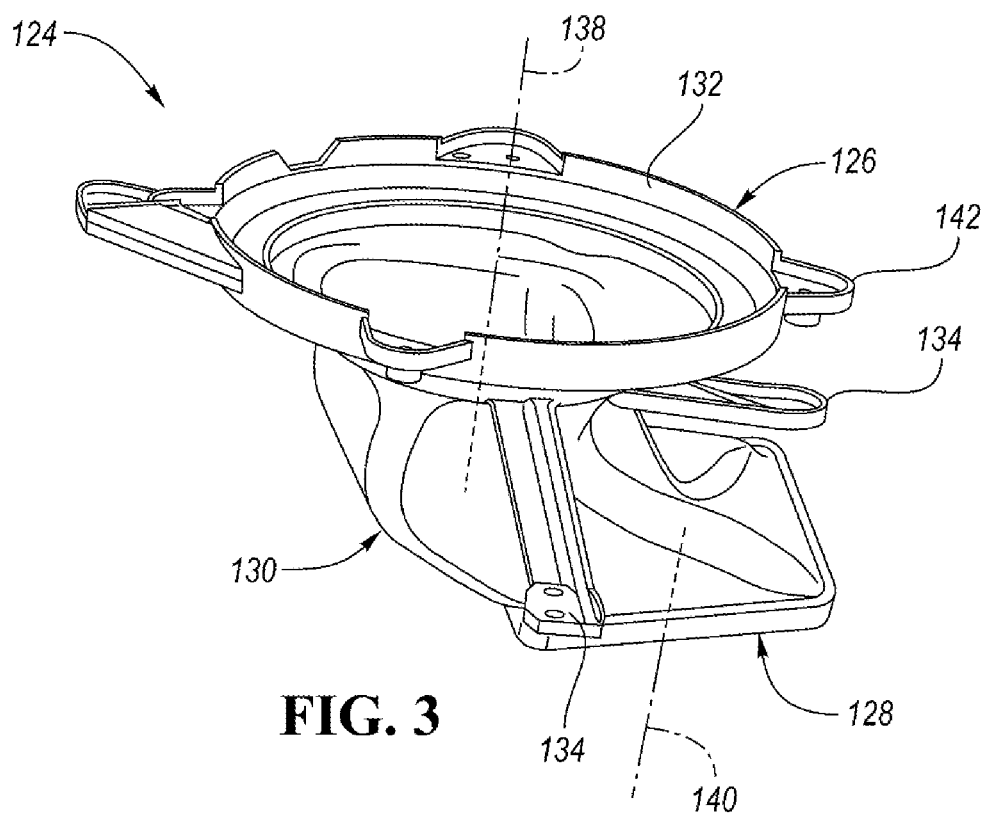
FIG. 3 is a perspective view of an acoustic coupler according to one or more embodiments.
Figure 4:
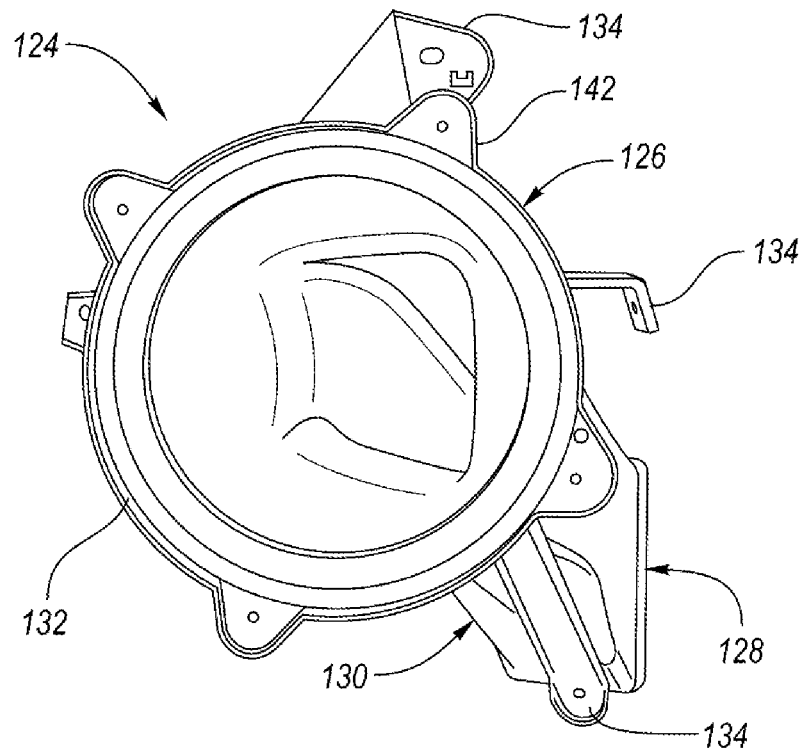
FIG. 4 is a top view of the acoustic coupler of FIG. 3.

As best shown in FIGS. 3 and 4, the acoustic coupler 124 comprises an inlet portion 126 disposed adjacent the second side 114 of the loudspeaker 102, an outlet portion 128 in fluid communication with the exterior 108 of the vehicle 100, and a conduit 130 extending between the inlet portion 126 and the outlet portion 128. As shown, the inlet portion 126 may have a generally circular configuration with a rim 132 arranged to correspond to a configuration of the second side 114 of the loudspeaker 102. The conduit 130 extends from the inlet portion 126 and may have a rectangular cross-section as shown or may have a circular or other cross-sectional shape, the cross-sectional area of the conduit 130 may be variable along its length, and the conduit may have a curvilinear contour. In one or more embodiments, the inlet portion 126 may have a larger cross-sectional area than the conduit 130, such that the acoustic coupler 124 decreases in cross-section from the second side 114 of the loudspeaker 102 to the outlet portion 128. The conduit 130 terminates at the outlet portion 128 which may be generally rectangular as shown or have other shapes and sizes, typically depending upon the design requirements for the exterior 108 of the vehicle 100 as described further below. The acoustic coupler 124 can be constructed from a rigid or flexible material, such as a plastic, metallic, or other suitable material.

Figure 5:
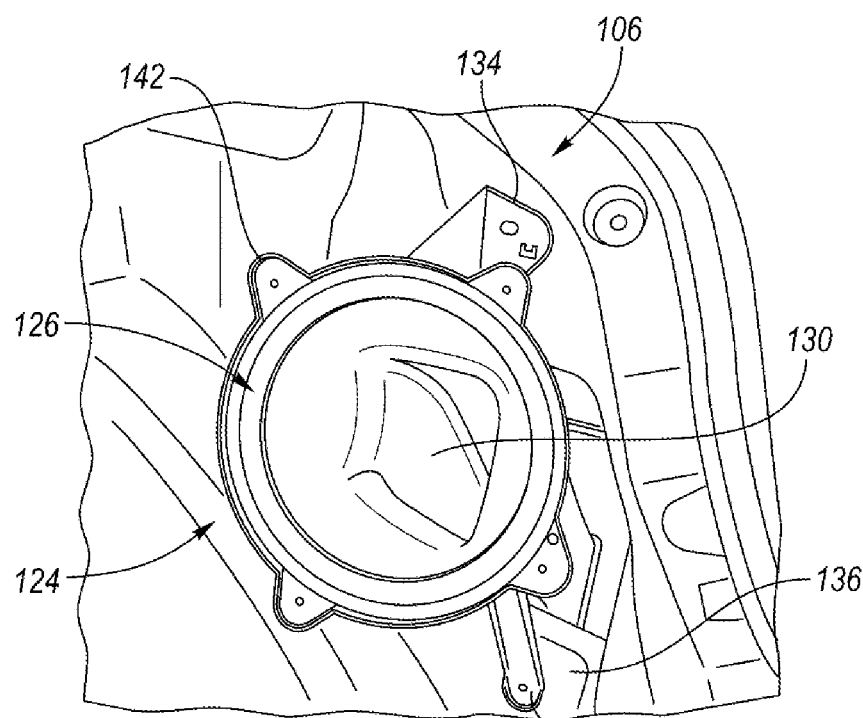
FIG. 5 is an illustration of an acoustic coupler mounted in the vehicle.

FIG. 5 illustrates an exemplary mounting position of an acoustic coupler 124 in the vehicle 100, in this instance in the trunk adjacent a right rear quarter panel. The acoustic coupler 124 may include one or more mounting arms 134 extending therefrom for fastening the acoustic coupler 124 to a frame element 136 or an interior body panel 104 of the vehicle 100. In one or more embodiments, the inlet portion 126, the conduit 130, and the outlet portion 128 need not be aligned along a common axis when mounted. Depending upon the mounting location within the vehicle 100, it may be desirable to have the loudspeaker 102 positioned in a location in the interior 106 that is not vertically and/or horizontally aligned with a location of the outlet portion 128. For instance, in the example shown in FIGS. 5 and 6, the loudspeaker 102 may be mounted within the interior 106 (e.g. trunk) of the vehicle 100 at vertical and horizontal location different from where it is desired to have the outlet portion 128 positioned with respect to the external rear quarter panel. In such an instance, as best shown in FIG. 3, the inlet portion 126 may be arranged or symmetric about a first longitudinal axis 138 and the outlet portion 128 may be arranged or symmetric about a second longitudinal axis 140, wherein the second longitudinal axis 140 is offset from the first longitudinal axis 138.

Figure 6:
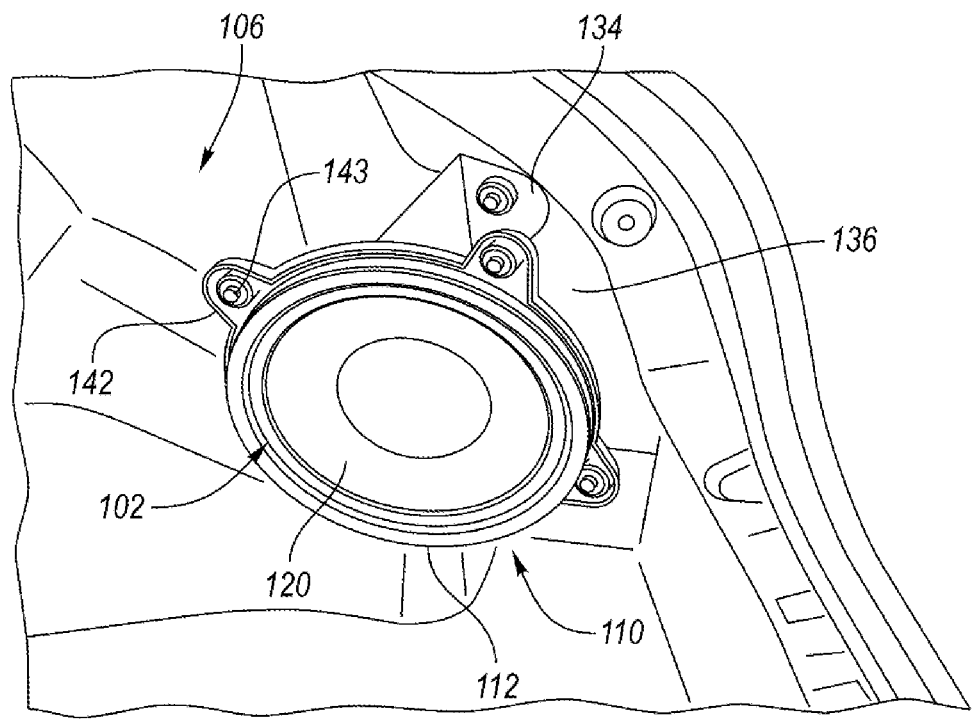
FIG. 6 is an illustration of a loudspeaker attached to an inlet portion of the acoustic coupler.

FIG. 6 shows a loudspeaker 102 attached to the inlet portion 126 of the acoustic coupler 124, where the inlet portion 126 may act as a rear housing or enclosure for the loudspeaker 102. The inlet portion 126 of the acoustic coupler 124 may be fastened to the loudspeaker 102. For this purpose, the inlet portion 126 may include mounting tabs 142 formed therein through which fasteners 143 can be used to secure the inlet portion 126 to the second side 114. Alternatively, the inlet portion 126 can be secured to the second side 114 of the loudspeaker 102 with adhesive or via any other suitable material. In another alternative, the acoustic coupler 124 could be integrally formed with the loudspeaker 102.

Figure 7:
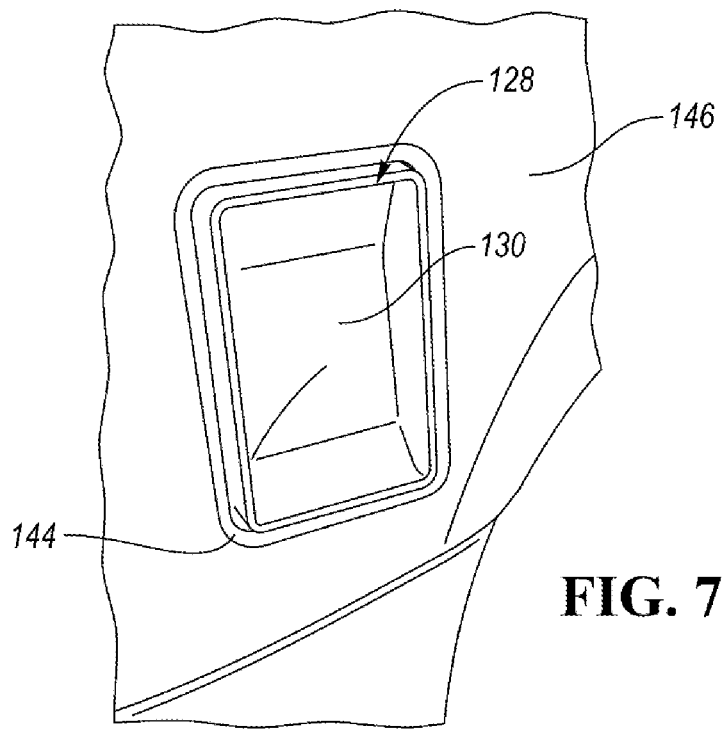
FIG. 7 is an illustration of an outlet portion of the acoustic coupler in an opening in an exterior body panel of a vehicle.
Figure 8:
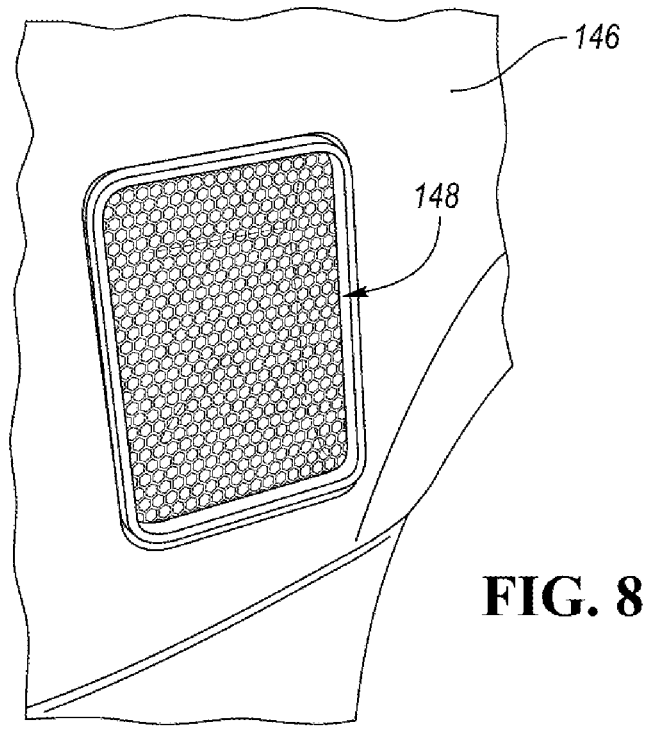
FIG. 8 is an illustration of an exterior speaker grill covering the outlet portion of the acoustic coupler.

Turning now to FIGS. 7 and 8, the acoustic coupler 124 may be structured to connect a second side 114 of the loudspeaker 102 to an opening 144 in an exterior body panel 146 of the vehicle 100. As shown, the outlet portion 128 may be received in or adjacent the opening, and an exterior speaker grill 148 may be provided for covering the outlet portion 128 at the exterior body panel 146. In an alternative embodiment, the exterior speaker grill 148 may not be visible, instead hidden under a body trim panel or other sheet metal while still in fluid communication with the ambient environment.

The dimensions of the acoustic coupler 124 may be selected to be proportional to the size and parameters of the loudspeaker 102. In one or more embodiments, it is desirable for the volume of the acoustic coupler 124 to be minimized, the cross-sectional area of the acoustic coupler 124 to be maximized, and the length of the acoustic coupler 124 (from the second side 114 of the loudspeaker 102 to the exterior body panel 146) to be minimized. These parameters may be selected to reinforce the idealized infinite baffle condition, which would be an acoustic coupler 124 of zero volume, zero length and the same cross-sectional area as the cone 120 of the loudspeaker 102. Accordingly, while a particular configuration of acoustic coupler 124 is shown and described herein, it is understood that the acoustic coupler 124 is not limited to this configuration, and that other geometries, lengths, and areas are contemplated and may be selected to optimize transmission of the acoustical signal to the interior and exterior of a specific vehicle.

When the second side 114 of the loudspeaker 102 is in fluid communication with the atmosphere on the exterior 108 of the vehicle 100, the loudspeaker 102 is considered to have an infinite baffle. One benefit of having the second side 114 in fluid communication with the open atmosphere is that undesirable resonances in the loudspeaker 102 may be reduced because sound waves emitted from the second side 114 of the loudspeaker 102 do not interfere with sound waves emitted from the first side 112 of the loudspeaker 102. Additionally, another benefit of the open environment, or infinite baffle, is that strain in the speaker cone 120 is reduced because the second side 114 of the loudspeaker 102 vents to the outside atmosphere. As a result, the loudspeaker 102 may produce a higher sound pressure level (SPL) at low frequency ranges in the vehicle interior 106.

The second side 114 of the loudspeaker 102 can also be exposed to environmental weathering, which can present a problem during extreme conditions such as water, snow, ice, heat, or particulates (mud, dirt, rocks). Accordingly, a weather shielding material 150 may be provided between the second side 114 of the loudspeaker 102 and the exterior 108 of the vehicle 100, such as at or near the outlet portion 128 of the acoustic coupler 124, which may then be covered by the exterior speaker grill 148. However, the order of the weather shielding material 150 and exterior speaker grill 148 is not specific, such that the positions of the weather shielding material 150 and the exterior speaker grill 148 could be reversed or even integrated into one assembly.

Since high sound quality is desired when audio entertainment is being provided on the exterior 108 of the vehicle 100, acoustic transparency is of importance. Acoustic transparency is defined as the total cross-sectional area of open air relative to the surface area of the speaker cone 120. In one or more embodiments, the combined acoustic transparency of all objects in the exterior acoustic path through the acoustic coupler 124, including the weather shielding material 150 and the exterior speaker grill 148, should be a minimum of 25% of the area of the speaker cone 120, and more ideally greater than 40% of the area of the speaker cone 120. When these requirements are met, the acoustic resonance may be minimized.

As illustrated schematically in FIG. 2, the vehicle 100 may include a control unit 152 that is in electrical communication with the loudspeaker assembly 110, including the loudspeaker 102 and any other loudspeakers included in the automotive audio system. The control unit 152 may be used for controlling various parameters of the loudspeaker 102 and the resulting acoustical signal, both for audio entertainment in the interior 106 and on the exterior 108 of the vehicle 100. Advantageously, the loudspeaker assembly 110 disclosed herein can utilize an externally coupled loudspeaker configuration to provide full, deep, low frequency content outside the vehicle without any adding any additional speakers. The loudspeaker assembly 110 may be combined with existing "safety speakers", such as legally-mandated electric vehicle pedestrian warning speakers, such that users can enjoy full-spectrum multimedia content outside of the vehicle whenever the use case arises.

External audio applications for the loudspeaker assembly 110 disclosed herein may include, for example, social environments such as tailgates, parties, or a worksite where users may desire to broadcast their content outside of the vehicle 100. When used with an electric vehicle, use of the ECS configuration disclosed herein for providing external audio should not have an impact on charging time and should have a negligible impact on range. In addition to the loudspeaker assembly 110, front and rear bumper speakers can be used to provide users with a full-band premium audio system.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A loudspeaker assembly for a vehicle, comprising:
   a loudspeaker mounted in the vehicle, the loudspeaker having a first side facing an interior of the vehicle and an opposed second side, wherein the loudspeaker is configured to generate an acoustical signal having a front wave directed into the interior of the vehicle and a rear wave directed away from the interior of the vehicle; and
   an acoustic coupler disposed on the second side of the loudspeaker and extending toward an exterior of the vehicle, the acoustic coupler including an inlet portion secured to the second side of the loudspeaker, an outlet portion in fluid communication with the exterior of the vehicle, and a conduit extending between the inlet portion and the outlet portion, the acoustic coupler arranged to transmit the rear wave to the exterior of the vehicle such that the acoustical signal is audible in the interior of the vehicle and at the exterior of the vehicle,
   wherein the acoustic coupler includes one or more mounting arms arranged between the inlet portion and the conduit to extend therefrom for fastening the acoustic coupler to the vehicle.

2. The loudspeaker assembly of claim 1, wherein a cross-sectional area of the inlet portion is a larger than a cross-sectional area of the conduit.

3. The loudspeaker assembly of claim 1, wherein the inlet portion is arranged about a first longitudinal axis and wherein the outlet portion is arranged about a second longitudinal axis offset from the first longitudinal axis.

4. The loudspeaker assembly of claim 1, wherein the inlet portion is secured to the second side of the loudspeaker.

5. The loudspeaker assembly of claim 1, wherein the outlet portion is arranged to be received in an opening of an exterior body panel of the vehicle.

6. The loudspeaker assembly of claim 5, further comprising an exterior speaker grill covering the outlet portion at the exterior body panel.

7. The loudspeaker assembly of claim 1, wherein the acoustic coupler is integrally formed with the loudspeaker.

8. The loudspeaker assembly of claim 1, further comprising a weather shielding material disposed between the second side of the loudspeaker and the exterior of the vehicle.

9. The loudspeaker assembly of claim 1, wherein the loudspeaker is a subwoofer.

10. An externally coupled loudspeaker assembly for a vehicle, comprising:
   a subwoofer mounted in the vehicle, the subwoofer having a first side facing an interior of the vehicle and an opposed second side, wherein the subwoofer is configured to generate an acoustical signal having a front wave directed into the interior of the vehicle and a rear wave directed away from the interior of the vehicle;
   an acoustic coupler having an inlet portion secured to the second side of the subwoofer, an outlet portion in fluid communication with an exterior of the vehicle, and a conduit extending between the inlet portion and the outlet portion, the acoustic coupler arranged to transmit the rear wave to the exterior of the vehicle such that the acoustical signal is audible in the interior of the vehicle and at the exterior of the vehicle; and
   one or more mounting arms arranged between the inlet portion and the conduit to extend therefrom for fastening the acoustic coupler to the vehicle.

11. The externally coupled loudspeaker assembly of claim 10, wherein a cross-sectional area of the inlet portion is larger than a cross-sectional area of the conduit.

12. The externally coupled loudspeaker assembly of claim 10, wherein the inlet portion has a first longitudinal axis and wherein the outlet portion has a second longitudinal axis offset from the first longitudinal axis.

13. The externally coupled loudspeaker assembly of claim 10, wherein the outlet portion is arranged to be received in an opening of an exterior body panel, the loudspeaker assembly further comprising an exterior speaker grill covering the outlet portion at the exterior body panel.

14. The externally coupled loudspeaker assembly of claim 10, further comprising a weather shielding material disposed between the second side of the subwoofer and the exterior of the vehicle.

15. An audio system for a vehicle, comprising:
   at least one loudspeaker assembly including a loudspeaker mounted in the vehicle, the loudspeaker having a first side facing an interior of the vehicle and an opposed second side, wherein the loudspeaker is configured to generate an acoustical signal having a front wave directed into the interior of the vehicle and a rear wave directed away from the interior of the vehicle, and an acoustic coupler disposed on the second side of the loudspeaker and extending toward an exterior of the vehicle, the acoustic coupler including an inlet portion secured to the second side of the loudspeaker, an outlet portion in fluid communication with the exterior of the vehicle, and a conduit extending between the inlet portion and the outlet portion, the acoustic coupler arranged to transmit the rear wave to the exterior of the vehicle such that the acoustical signal is audible in the interior of the vehicle and at the exterior of the vehicle, the acoustic coupler including one or more mounting arms arranged between the inlet portion and the conduit to extend therefrom for fastening the acoustic coupler to the vehicle; and
   a control unit in electrical communication with the at least one loudspeaker assembly for controlling parameters of the loudspeaker and the generated acoustic signal.

16. The audio system of claim 15, wherein the outlet portion is arranged to be received in an opening of an exterior body panel, the loudspeaker assembly further comprising an exterior speaker grill covering the outlet portion at the exterior body panel.

17. The audio system of claim 15, wherein the loudspeaker is a subwoofer.

* * * * *